United States Patent
Taibi et al.

(10) Patent No.: US 10,708,631 B2
(45) Date of Patent: Jul. 7, 2020

(54) METHOD AND TERMINAL FOR TILE SELECTION AMONGST A SET OF TILES

(71) Applicant: INTERDIGITAL CE PATENT HOLDINGS, SAS, Paris (FR)

(72) Inventors: Charline Taibi, Chartres de Bretagne (FR); Frederique Humbert, Rennes (FR); Yvon Legallais, Rennes (FR); Charles Salmon-Legagneur, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/139,387

(22) Filed: Sep. 24, 2018

(65) Prior Publication Data

US 2019/0098341 A1    Mar. 28, 2019

(30) Foreign Application Priority Data

Sep. 26, 2017 (EP) .................................... 17306267

(51) Int. Cl.
| | |
|---|---|
| H04N 21/218 | (2011.01) |
| H04N 21/4728 | (2011.01) |
| H04N 21/6587 | (2011.01) |
| H04N 21/637 | (2011.01) |
| H04N 19/513 | (2014.01) |
| G06T 7/215 | (2017.01) |

(52) U.S. Cl.
CPC ....... *H04N 21/21805* (2013.01); *G06T 7/215* (2017.01); *H04N 19/513* (2014.11); *H04N 21/4728* (2013.01); *H04N 21/637* (2013.01); *H04N 21/6587* (2013.01)

(58) Field of Classification Search
CPC combination set(s) only.
See application file for complete search history.

(56) References Cited

U.S. PATENT DOCUMENTS

| | | |
|---|---|---|
| 2013/0258036 A1 | 10/2013 | Tong et al. |
| 2017/0118540 A1 | 4/2017 | Thomas et al. |

FOREIGN PATENT DOCUMENTS

| | | |
|---|---|---|
| EP | 2434772 | 3/2012 |

OTHER PUBLICATIONS

Champel et al., "Key factors for a highh-quality VR experience", Application of Digital Image Processing XL, SPIE vol. 10396, Sep. 19, 2017, pp. 1-12.

*Primary Examiner* — Janese Duley
(74) *Attorney, Agent, or Firm* — Volpe and Koenig, P.C.

(57) ABSTRACT

A method for selecting a tile amongst a set of tiles associated with a multimedia content divided into a plurality of tile segments requested by a terminal is described. The multimedia content that is divided into a plurality of tile segments, includes obtaining a next position of a viewport of the terminal at the expiration of a current tile segment based on an estimation of a trajectory of the viewport; identifying one or several tiles amongst the set of tiles comprising at least the viewport at the next position; determining at least one processing parameter depending on at least the center of the identified tile and the next position of the viewport; and selecting an identified tile for which the determined processing parameter meets a selection criterion.

15 Claims, 4 Drawing Sheets

METHOD AND TERMINAL FOR TILE SELECTION AMONGST A SET OF TILES

REFERENCE TO RELATED EUROPEAN APPLICATION

This application claims priority from European Patent Application No. 17306267.0, entitled "METHOD AND TERMINAL FOR TILE SELECTION AMONGST A SET OF TILES", filed on Sep. 26, 2017, the contents of which are hereby incorporated by reference in its entirety.

TECHNICAL FIELD

The present disclosure relates to the streaming of Virtual Reality (VR) multimedia content (such as VR 360° videos or VR panoramic videos) to an end device through a delivery network, and especially to a tile based video streaming.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

VR 360° videos offer an immersive experience wherein a user can look around using a VR head-mounted display (HMD) or can navigate freely within a scene on a flat display by controlling the viewport with a controlling apparatus (such as a mouse or a remote control).

Such a freedom in spatial navigation requires that the whole 360° scene is delivered to a player (embedded within the HMD or TV set) configured to extract the video portion to be visualized depending on the position of the viewport within the scene. Therefore, a high throughput is necessary to deliver the video. Indeed, it is commonly admitted that a physical space field of vision surrounded by the 360° horizontal direction and 180° vertical direction can be entirely covered by a user within a minimum set of twelve viewports. To offer an unrestricted VR 360° video service in 4K resolution, a video stream equivalent to twelve 4K videos has to be provided.

Therefore, one main issue relies on the efficient transmission of VR 360° videos over bandwidth constrained network with an acceptable quality of immersive experience (i.e. avoiding freeze screen, blockiness, black screen, etc.). Currently, for delivering a VR 360° video service in streaming, a compromise has to be reached between immersive experience, resolution of video and available throughput of the content delivery network.

The majority of known solutions streaming VR 360° videos provides the full 360° scene to the end device, but only less than 10% of the whole scene is presented to the user. Since delivery networks have limited throughput, the video resolution is decreased to meet bandwidth constraints.

Other known solutions mitigate the degradation of the video quality by reducing the resolution of the portion of the 360° scene arranged outside of the current viewport of the end device. Nevertheless, when the viewport of the end device is moved upon user's action to a low resolution area, the displayed video suffers from a sudden degradation.

The present disclosure has been devised with the foregoing in mind.

SUMMARY

The disclosure concerns a method for selecting, at a terminal, a tile amongst a set of tiles associated with a multimedia content requested by the terminal, said multimedia content being divided into a plurality of tile segments, said method comprising:
  obtaining a next position of a viewport of the terminal at the expiration of a current tile segment based on an estimation of a trajectory of the viewport;
  identifying one or several tiles amongst the set of tiles comprising at least the viewport at the next position;
  for each identified tile, determining at least one processing parameter depending on at least the center of the identified tile and said next position of the viewport;
  selecting an identified tile for which the determined processing parameter meets a selection criterion.

In an embodiment, the processing parameter can be a scalar product of a distance vector with a movement vector, and the selection criterion can be met when the scalar product of an identified tile is higher than the scalar products of the other identified tiles.

In an embodiment, the distance vector can be defined between said next position of the viewport and a center of an identified tile, and the movement vector can be defined from the current position of the viewport and the next position of the viewport.

In an embodiment, the processing parameter can be a distance between said next position of the viewport and a center of an identified tile, and the selection criterion can be met when the distance of an identified tile is smaller than the distance of the other identified tiles.

In an embodiment, the identified tiles can comprise at least the viewport.

In an embodiment, each identified tile can present an overlap with a tile associated with the current tile segment.

In an embodiment, the estimation of the trajectory of the viewport can be obtained by linear approximation.

In an embodiment, the next position of the viewport can be obtained by extrapolation from the estimated trajectory.

In an embodiment, the selecting of an identified tile can rely on the determination of a scalar product except:
  when the viewport is arranged near the poles of the sphere (e.g. when considering a VR 360° video), and/or
  when the movement vector direction has just changed, for which the selecting of an identified tile can rely on the determination of a distance as previously described.

The present disclosure further concerns a terminal configured to select a tile amongst a set of tiles associated with a multimedia content requested by the terminal, said multimedia content being divided into a plurality of tile segments, wherein said terminal comprises one memory and one processing circuitry configured to perform:
  obtaining a next position of a viewport of the terminal at the expiration of a current tile segment based on an estimation of a trajectory of the viewport;
  identifying one or several tiles amongst the set of tiles comprising at least the viewport at the next position;
  for each identified tile, determining at least one processing parameter depending at least on the center of the identified tile and said next position of the viewport;
  selecting an identified tile for which the determined processing parameter meets a selection criterion.

In an embodiment, the processing parameter can be a scalar product of a distance vector with a movement vector, and the selection criterion can be met when the scalar product of an identified tile is higher than the scalar products of the other identified tiles.

In an embodiment, the distance vector can be defined between said next position of the viewport and a center of an identified tile, and the movement vector can be defined from the current position of the viewport and the next position of the viewport.

In an embodiment, the processing parameter can be a distance between said next position of the viewport and a center of an identified tile, and the selection criterion can be met when the distance of an identified tile is smaller than the distance of the other identified tiles.

In an embodiment, the identified tiles can comprise at least the viewport.

In an embodiment, each identified tile can present an overlap with a tile associated with the current tile segment.

In an embodiment, the estimation of the trajectory of the viewport can be obtained by linear approximation.

In an embodiment, the next position of the viewport can be obtained by extrapolation from the estimated trajectory.

Besides, the present disclosure is further directed to a non-transitory program storage device, readable by a computer, tangibly embodying a program of instructions executable by the computer to perform a method for selecting, at a terminal, a tile amongst a set of tiles associated with a multimedia content requested by the terminal, said multimedia content being divided into a plurality of tile segments, which comprises:

obtaining a next position of a viewport of the terminal at the expiration of a current tile segment based on an estimation of a trajectory of the viewport;

identifying one or several tiles amongst the set of tiles comprising at least the viewport at the next position;

for each identified tile, determining at least one processing parameter depending on at least the center of the identified tile and said next position of the viewport;

selecting an identified tile for which the determined processing parameter meets a selection criterion.

The present disclosure also concerns a computer program product which is stored on a non-transitory computer readable medium and comprises program code instructions executable by a processor for implementing a method for selecting, at a terminal, a tile amongst a set of tiles associated with a multimedia content requested by the terminal, said multimedia content being divided into a plurality of tile segments, which comprises:

obtaining a next position of a viewport of the terminal at the expiration of a current tile segment based on an estimation of a trajectory of the viewport;

identifying one or several tiles amongst the set of tiles comprising at least the viewport at the next position;

for each identified tile, determining at least one processing parameter depending on at least the center of the identified tile and said next position of the viewport;

selecting an identified tile for which the determined processing parameter meets a selection criterion.

The method according to the disclosure may be implemented in software on a programmable apparatus. It may be implemented solely in hardware or in software, or in a combination thereof.

Some processes implemented by elements of the present disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the method for tile selection according to the disclosure.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

Figure 1:
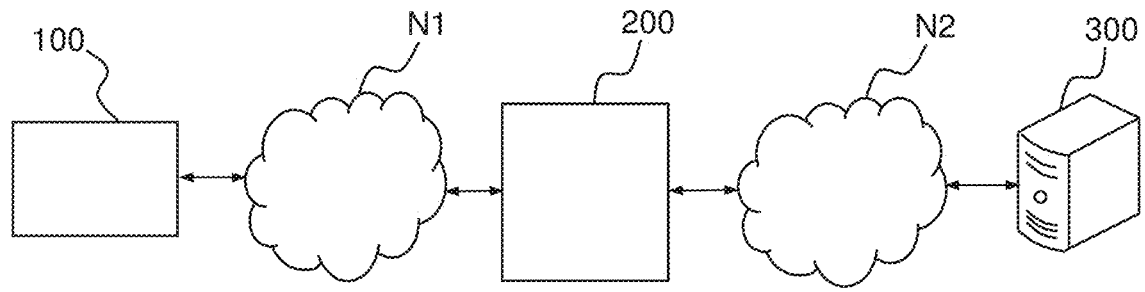
FIG. 1 is a schematic diagram of an exemplary Client-Server network architecture wherein the present principles might be implemented.

The following description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

The present disclosure is depicted with regard to a streaming environment to deliver a VR multimedia content (such as a 360° video or a panoramic video) to a client terminal through a delivery network.

As shown in FIG. 1, the Client-Server network architecture, wherein the present principles might be implemented, comprises a client terminal 100, a gateway 200 and one or more servers 300 (only one is represented on FIG. 1).

The client terminal 100—connected to the gateway 200 through a first network N1 (such as a home network or an enterprise network)—may wish to request a VR video stored on a remote server 300 through a second network N2 (such as the Internet network). The first network N1 is connected to the second network N2 thanks to the gateway 200.

The server 300 streams segments to the client terminal 100, upon the client request, using a streaming protocol (such as the HTTP adaptive streaming protocol, so called HAS, like MPEG-DASH).

Figure 2:
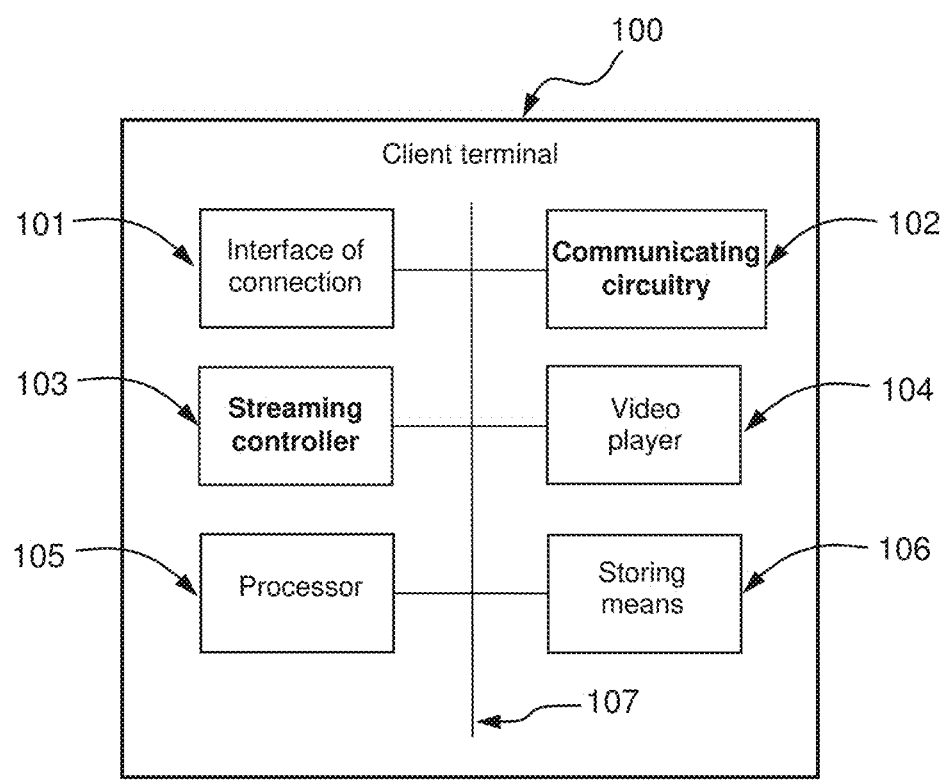
FIG. 2 is a schematic block diagram of an exemplary client terminal wherein the present principles might be implemented.

As shown in the example of FIG. 2, the client terminal 100 can comprise at least:
- an interface of connection 101 (wired and/or wireless, as for example Wi-Fi, Ethernet, 4G, etc.) to the first network N1;
- a communication circuitry 102 containing the protocol stacks to communicate with the server 300. In particular, the communication module 102 comprises the TCP/IP stack well known in the art. Of course, it could be any other type of network and/or communicating means enabling the client terminal 100 to communicate with the server 300;
- a streaming controller 103 which receives the VR video 10 from the server 300;
- a video player 104 adapted to decode and render the multimedia content;
- one or more processor(s) 105 for executing the applications and programs stored in a non-volatile memory of the client terminal 100;
- storing means 106, such as a volatile memory, for buffering the segments received from the server 300 before their transmission to the video player 104;
- an internal bus 107 to connect the various modules and all means well known to the skilled in the art for performing the generic client terminal functionalities.

As an example, the client terminal 100 is a portable media device, a mobile phone, a tablet or a laptop, a head mounted device, a set-top box or the like. Naturally, the client terminal 100 might not comprise a complete video player, but only some sub-elements such as the ones for demultiplexing and decoding the media content and might rely upon an external means to display the decoded content to the end user.

Figure 3:
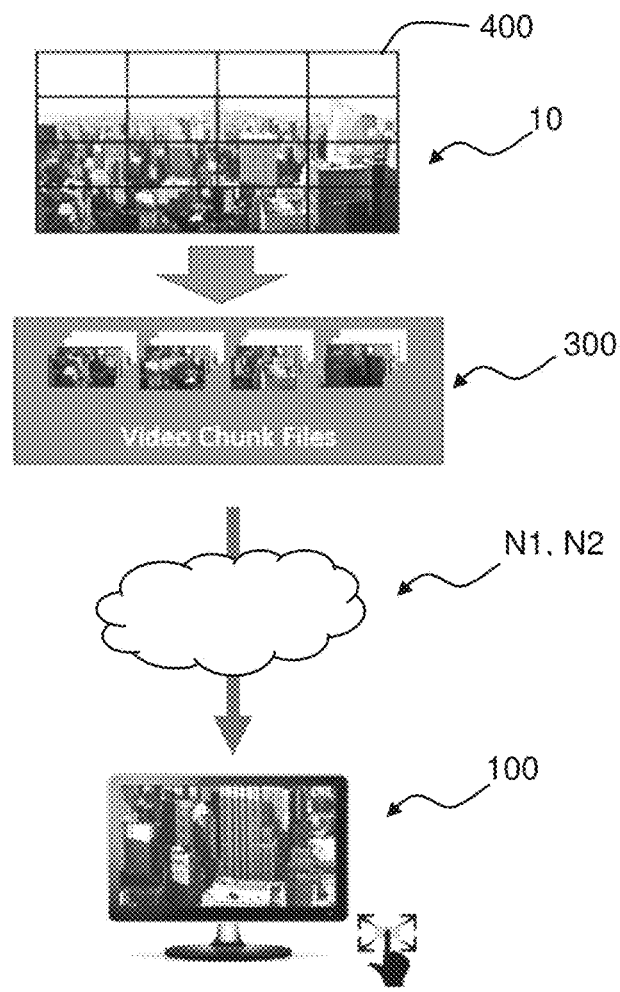
FIG. 3 is an exemplary delivery system wherein the present principles can be implemented.

As depicted in FIG. 3, in a tile based video service, the VR video 10 (in the shown example, a panoramic video) is sliced into a set of tiles at the server side. The set of tiles covers the whole scene of the VR video 10.

Figure 4:
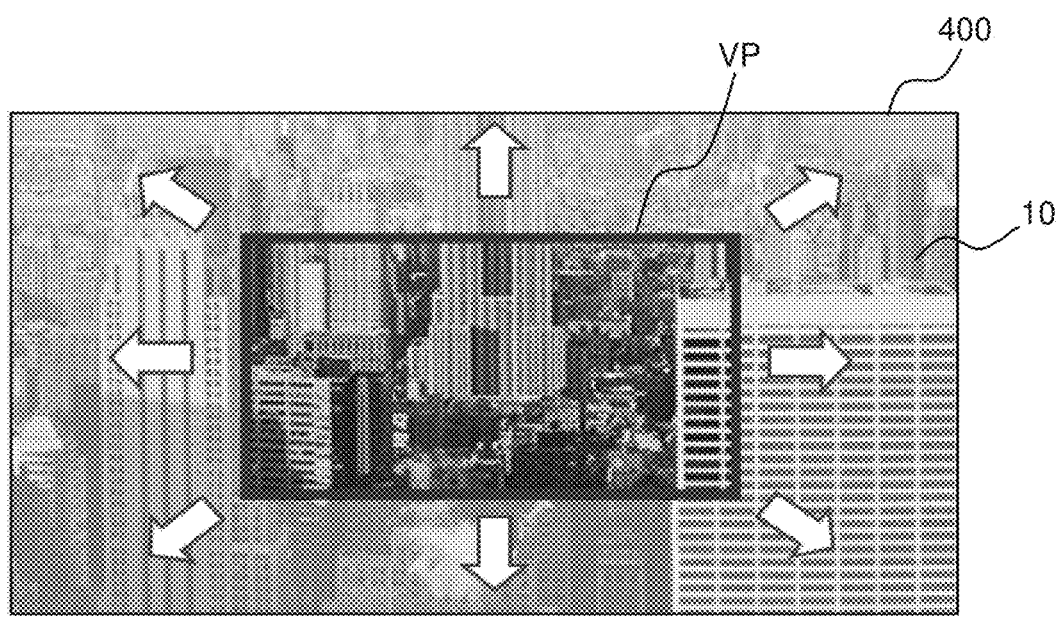
FIG. 4 shows an exemplary tile comprising a viewport according to the present principles.

It is assumed hereafter that only one tile can be delivered to the terminal 100, such a tile covering a larger part of the scene than the viewport VP associated with the client terminal 100 requesting the VR video 10 (as shown in the example of FIG. 4 compliant with the present principles). The size of the tiles can be defined large enough to allow a variation of the aiming point without being forced to obtain and decode instantaneously another tile.

Figure 5:
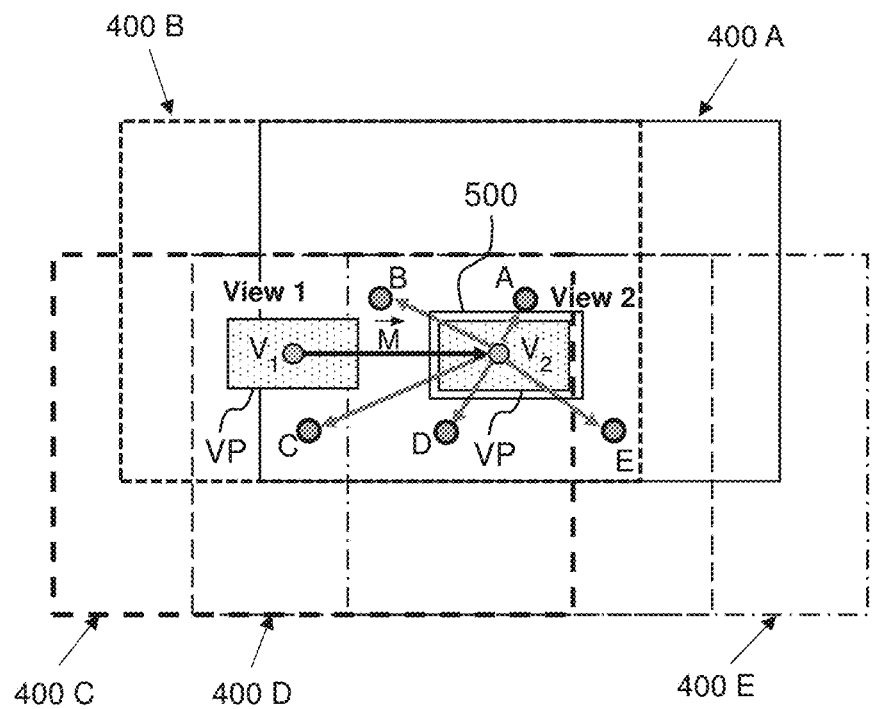
FIG. 5 shows exemplary tiles of set of tiles covering a Virtual Reality content according to the present principles.

It is further assumed that an overlap exists between consecutive tiles of the set of tiles as depicted in the example of FIG. 5 according to the present principles. Naturally, while a tile of rectangular shape has been illustrated in FIGS. 4 and 5, the present principles can be applied to any other type of tile shape.

As shown in the example of FIG. 5, a user is panning horizontally passing from the viewport position V1 at time t1 to the viewport position V2 at time t2. For instance, the user can control the viewport position with an appropriate apparatus or action, which can depend on the type of the terminal 100 (e.g. a remote control for a TV set, a head movement for a head mounted device, a tilt of a tablet or smartphone, etc.). The user's action can be transmitted to the video player 104 of the terminal 100, for instance in the form of Cartesian coordinates (x,y) for a panoramic video or polar angle and azimuthal angle for a VR 360° video.

Figure 6:
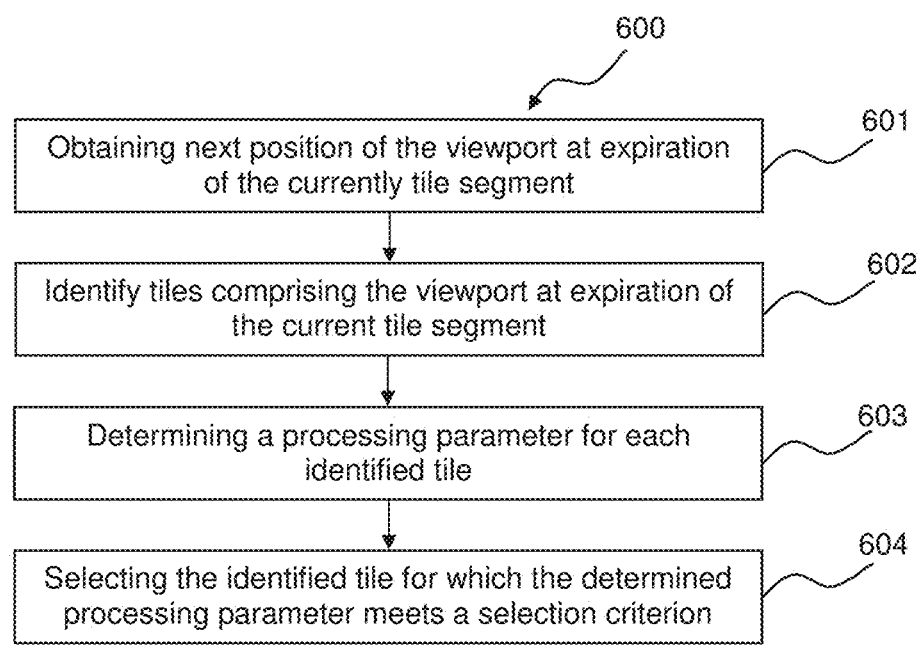
FIG. 6 is flow chart of an exemplary method used by some embodiments of the present principles for selecting a tile amongst a set of tiles.

According to the present principles, as shown in FIG. 6, the client terminal 100 can be configured to implement the method 600 for selecting a tile 400 amongst a set of tiles associated with a VR video 10 divided into a plurality of tile segments (each tile is associated with a segment of the VR video).

The client terminal (e.g. thanks to its streaming controller 103 or processor(s) 105) can obtain, in a step 601, the next position of the viewport VP of the terminal 100—at the expiration of a current tile segment—based on an estimation of the trajectory of the viewport VP.

As shown in the example of FIG. 5, at time t1, the video player 104 is consuming the video segment associated with the selected tile, which expires at time t2. Before t2, the streaming controller 103 of the terminal 100 has to select the next tile to be decoded to generate the View 2.

Figure 7:
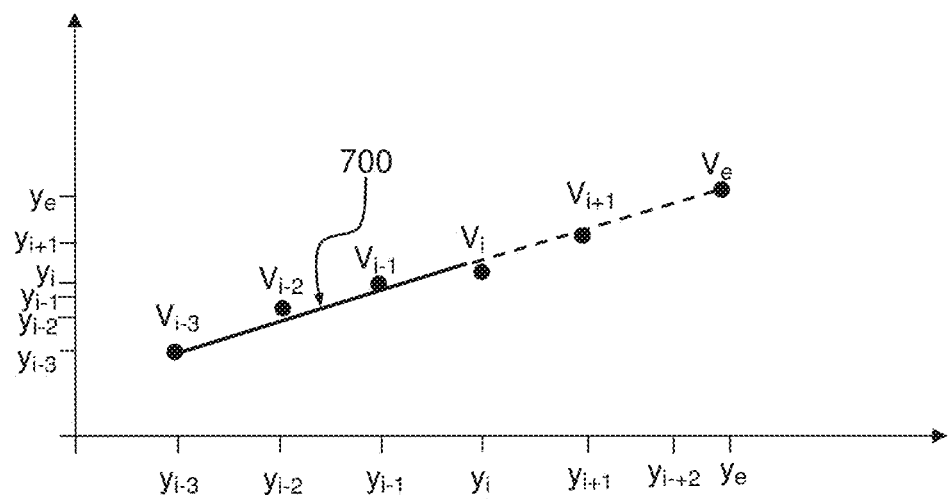
FIG. 7 depicts an exemplary estimation of the viewport trajectory of the client terminal of FIG. 2, according to the present principles.

To that end, the trajectory 700 of the center Vi of the viewport VP can, for instance, be obtained by linear approximation thanks to the movement vector $\vec{M}$ determined, for instance, from intermediate positions Vi (as shown in the example of FIG. 7). In a variant or complement, an approximation of the trajectory can be obtained from the movement vector and the acceleration associated with the viewport VP.

Once the trajectory 700 of the viewport VP has been estimated, the viewport position V2 at expiration of the current tile segment (time t2 in the example of FIG. 5) can be determined by extrapolation of the estimated trajectory 700 as shown, for instance, in FIG. 7.

In a step 602, the client terminal 100 (e.g. thanks to its streaming controller 103 or processor(s) 105) can identify one or several tiles 400 amongst the set of tiles comprising at least the viewport VP at the next position V2. Each identified tile (references 400A, 400B, 400C, 400D, 400E in the example of FIG. 5) comprises all the pixels of the frame which will be displayed at time t2. Since the position of V2 of the viewport VP at time t2 is estimated, an area 500 around the viewport VP can be defined to consider estimation errors. The identification of the tiles comprising the viewport VP at time t2 depends on the shape of the tiles and their type of distribution on the scene.

In a step 603, the client terminal 100 (e.g. thanks to its streaming controller 103 or processor(s) 105) can determine, for each identified tile 400A, 400B, 400C, 400D and 400E, a processing parameter depending, for instance, on the center of the identified tile and the position of the viewport VP at time t2.

In a first embodiment compliant with the present principles, the processing parameter is a scalar product SP of a distance vector $\vec{V}$ with the movement vector $\vec{M}$.

Figure 8:
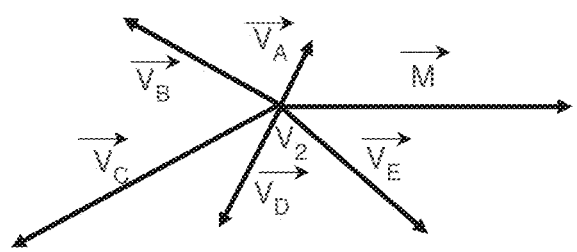
FIG. 8 shows exemplary distance and movement vectors associated with tiles shown in FIG. 5, according to the present principles.

In the example of FIG. 5, the points A, B, C, D and E represent the center of identified tiles 400A, 400B, 400C, 400D and 400E. The following distance vectors can be defined (as further depicted in FIG. 8) as follows:

$\vec{V_A}$: distance vector between $V_2$ and A;

$\vec{V_B}$: distance vector between $V_2$ and B;

$\vec{V_C}$: distance vector between $V_2$ and C;

$\vec{V_D}$: distance vector between $V_2$ and D;

$\vec{V_E}$: distance vector between $V_2$ and E;

$\vec{M}$: distance vector between $V_1$ and $V_2$, which further corresponds to the movement vector.

For each distance vector $\vec{V_A}$ to $\vec{V_E}$, the following scalar products can be computed:

$P_A = \vec{V_A} \cdot \vec{M}$ $P_B = \vec{V_B} \cdot \vec{M}$ $P_C = \vec{V_C} \cdot \vec{M}$ $P_D = \vec{V_D} \cdot \vec{M}$ $P_E = \vec{V_E} \cdot \vec{M}$ Once the scalar products associated with the identified tiles have been computed, the client terminal 100 can select, in a step 603, the identified tile for which the corresponding computed scalar product is higher than the scalar products of the other identified tiles. In the example of FIG. 5, tile 400E is selected.

In a second embodiment compliant with the present principles, the processing parameter is the distance between the position V2 of the viewport VP at the expiration of the current segment (time t2) and the center of an identified tile.

Then, the client terminal 100 (e.g. thanks to its streaming controller 103 or processor(s) 105) selects (in step 603) the tile for which the associated distance is smaller than the distances computed for the other identified tile. In the example of FIG. 5, tile 400A is selected.

In a third embodiment, the tile selection (step 603) combines both first and second embodiments. In particular, the tile selection can be implemented according to the first embodiment except:

when the viewport is arranged near the poles (when considering a VR 360° video), and/or when the movement vector direction has just changed, for which the tile selection relies on the second embodiment.

In a tile based video streaming (such as adaptive streaming), the present principles can allow to select a tile not only by considering its distance from the current viewport but also by taking the user's movement into account. By selecting a video tile as far as possible in the movement direction, the duration of the recovery between viewport and tile can be improved, reducing the risk of leaving the covered scene area too early. In adaptive streaming, moving from a tile to another one can be achieved only at the beginning of (sub)segment, i.e. at a periodicity of the (sub)segment duration which can vary for a few hundreds of milliseconds to several seconds. Therefore, the process to choose the tile according to the user's aiming point is decisive for the quality of the user experience.

Thanks to the present principles, a user can then be allowed to pan across the VR video without risking the occurrence of a black areas displayed due to a lack of video data.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method for selecting, at a terminal, a tile amongst a set of tiles associated with a multimedia content requested by the terminal, said multimedia content being divided into a plurality of tile segments, said method comprising:
    obtaining a next position of a viewport of the terminal at an expiration of a current tile segment based on an estimation of a trajectory of the viewport;
    identifying one or several tiles amongst the set of tiles, consecutive ones of the one or several tiles overlap one another and each of the one or several tiles comprising at least the viewport at the next position;
    for each identified tile, determining at least one processing parameter depending on at least a center of the identified tile and said next position of the viewport; and
    selecting an identified tile for which the determined at least one processing parameter meets a selection criterion.

2. The method according to claim 1, wherein:
    the processing parameter is a scalar product of a distance vector with a movement vector;
    the selection criterion is met when the scalar product of an identified tile is higher than the scalar products of the other identified tiles.

3. The method according to claim 2, wherein:
    the distance vector is defined between said next position of the viewport and a center of an identified tile;
    the movement vector is defined from the current position of the viewport and the next position of the viewport.

4. The method according to claim 1, wherein:
    the processing parameter is a distance between said next position of the viewport and a center of an identified tile
    the selection criterion is met when the distance of an identified tile is smaller than the distance of the other identified tiles.

5. The method according to claim 1, wherein the identified tiles comprise at least the viewport.

6. The method according to claim 1, wherein each identified tile presents an overlap with a tile associated with the current tile segment.

7. The method according to claim 1, wherein the estimation of the trajectory of the viewport is obtained by linear approximation.

8. The method according to claim 1, wherein the next position of the viewport is obtained by extrapolation from the estimated trajectory.

9. A terminal configured to select a tile amongst a set of tiles associated with a multimedia content requested by the terminal, said multimedia content being divided into a plurality of tile segments,
    wherein said terminal comprises one memory and one processing circuitry configured to perform:
        obtaining a next position of a viewport of the terminal at an expiration of a current tile segment based on an estimation of a trajectory of the viewport;
        identifying one or several tiles amongst the set of tiles, consecutive ones of the one or several tiles overlap one another and each of the one or several tiles comprising at least the viewport at the next position;
        for each identified tile, determining at least one processing parameter depending on at least a center of the identified tile and said next position of the viewport;
        selecting an identified tile for which the determined at least one processing parameter meets a selection criterion.

10. The terminal according to claim 9, wherein:
    the processing parameter is a scalar product of a distance vector with a movement vector;
    the selection criterion is met when the scalar product of an identified tile is higher than the scalar products of the other identified tiles.

11. The terminal according to claim 10, wherein:
    the distance vector is defined between said next position of the viewport and a center of an identified tile;
    the movement vector is defined from the current position of the viewport and the next position of the viewport.

12. The terminal according to claim 9, wherein:
    the processing parameter is a distance between said next position of the viewport and a center of an identified tile;
    the selection criterion is met when the distance of an identified tile is smaller than the distance of the other identified tiles.

13. The terminal according to claim 9, wherein the identified tiles comprise at least the viewport.

14. The terminal according to claim 9, wherein each identified tile presents an overlap with a tile associated with the current tile segment.

15. A computer program product which is stored on a non-transitory computer readable medium and comprises program code instructions executable by a processor for implementing a method for selecting, at a terminal, a tile amongst a set of tiles associated with a multimedia content requested by the terminal, said multimedia content being divided into a plurality of tile segments, which comprises:
    obtaining a next position of a viewport of the terminal at an expiration of a current tile segment based on an estimation of a trajectory of the viewport;

identifying one or several tiles amongst the set of tiles, consecutive ones of the one or several tiles overlap one another and each of the one or several tiles comprising at least the viewport at the next position;

for each identified tile, determining at least one processing parameter depending on at least a center of the identified tile and said next position of the viewport;

selecting an identified tile for which the determined at least one processing parameter meets a selection criterion.

\* \* \* \* \*